United States Patent [19]

Steigleiter et al.

[11] Patent Number: 5,155,081
[45] Date of Patent: Oct. 13, 1992

[54] PLATINUM-ON-GRAPHITE CATALYSTS

[75] Inventors: Werner Steigleiter, Limburgerhof; Wolfgang Hoelderich, Frankenthal; Franz-Josef Weiss, Neuhofen; Hugo Fuchs, Ludwigshafen; Luc Guns, Mannheim; Gerald Neubauer, Weinheim; Josef Ritz, Ludwigshafen, all of Fed. Rep. of Germany

[73] Assignee: BASF Aktiengesellschaft, Ludwigshafen, Fed. Rep. of Germany

[21] Appl. No.: 730,756

[22] Filed: Jul. 16, 1991

[30] Foreign Application Priority Data

Jul. 18, 1990 [DE] Fed. Rep. of Germany ....... 4022851

[51] Int. Cl.$^5$ .......................... B01J 23/42; B01J 27/20
[52] U.S. Cl. ...................................... 502/185
[58] Field of Search ............................................ 502/185

[56] References Cited

U.S. PATENT DOCUMENTS

| 2,823,101 | 2/1958 | Jockers et al. | |
| 3,663,166 | 5/1971 | Weise et al. | 502/185 X |
| 3,996,165 | 12/1976 | El-Ghatta et al. | 502/185 |
| 4,052,336 | 10/1977 | van Montfoort et al. | 502/185 |
| 4,122,040 | 10/1978 | McCarroll et al. | 252/447 |
| 4,158,047 | 6/1979 | van de Moesdijk et al. | 502/185 X |
| 4,889,704 | 12/1989 | Fuchs et al. | 502/185 X |
| 4,895,711 | 1/1990 | Biffar et al. | 423/387 |
| 4,978,649 | 12/1990 | Surovikia et al. | 502/416 |
| 4,992,252 | 2/1991 | Ichfhashi et al. | 423/387 |

FOREIGN PATENT DOCUMENTS

| 0008479 | 3/1980 | European Pat. Off. | 502/185 |
| 0060317 | 9/1982 | European Pat. Off. | |
| 2447972 | 4/1975 | Fed. Rep. of Germany | 502/185 |
| 7902291 | 9/1991 | Netherlands | 502/185 |
| 0316468 | 10/1971 | U.S.S.R. | 502/185 |
| 88/04197 | 6/1988 | World Int. Prop. O. | |

OTHER PUBLICATIONS

Katalytische Hydrierungen im organisch chemischen Laboratorium, F. Zimalkowski Ferdinand Enke Verlag, Stuttgart (1965).
Structure of Metallic Catalysts, Anderson, Academic Press (1975).
Mantell, C. L., *Industrial Carbon*, 2nd ed., D. Van Nostrand Company, Inc., New York, N.Y., 1946, p. 383.

*Primary Examiner*—W. J. Shine
*Assistant Examiner*—Douglas J. McGinty
*Attorney, Agent, or Firm*—Keil & Weinkauf

[57] ABSTRACT

A platinum-on-graphite catalyst having a platinum content of from 0.01 to 5% w/w, wherein the graphite support has an apparent density of from 1.7 to 2.2 g/ml and the use thereof as a hydrogenation catalyst.

8 Claims, No Drawings

PLATINUM-ON-GRAPHITE CATALYSTS

Suitable catalysts for the hydrogenation of organic and inorganic compounds are noble metals, such as palladium, platinum and ruthenium, deposited on various supports, such as silicon dioxide, aluminum oxide, graphite and activated charcoal, as has been described in "*Katalytische Hydrierungen im organisch chemischen Laboratorium*" F. Zimalkowski, Ferdinand Enke Verlag, Stuttgart (1965).

An important factor influencing the activity of such catalysts is the high degree of dispersion of the noble metal on the catalyst support. As disclosed in "*Structure of Metallic Catalysts*" J. F. Anderson, Academic Press (1975) pp. 164 et seq., the conditions used for the reaction and agglomeration can cause an increase in the particle size of the deposited noble metal and a decrease in the degree of dispersion and also detachment of the noble metal from the supporting material.

DE-PS 956,038 describes platinum-on-graphite catalysts which are produced by precipitating platinum onto a suspended graphite support, optionally together with poisoning agents such as compounds containing sulfur, selenium, arsenic or tellurium. Such catalysts are suitable, for example, for the catalytic hydrogenation of nitrogen oxide. These catalysts suffer from the drawback of rapid loss of activity and selectivity after prolonged use.

It is thus an object of the present invention to provide platinum-on-graphite catalysts which have a long useful life, show a high degree of selectivity, give rise to good space-time yields and show less tendency to loss of activity.

This object is achieved by a platinum-on-graphite catalyst having a platinum content of from 0.01 to 5% w/w, wherein the graphite support has an apparent density of from 1.7 to 2.2 g/ml.

The invention also relates to the use of a platinum-on-graphite catalyst, in which the graphite support has an apparent density of from 1.7 to 2.2 g/ml, as a hydrogenation catalyst.

The platinum-on-graphite catalysts of the invention have the advantage that changes therein occur more slowly and their useful life is thus longer and that they give rise to good selectivity and a high space-time yield in hydrogenation reactions. Another advantage is that they require regeneration less often, which reduces the consumption of chemicals and the loss of platinum.

The platinum-on-graphite catalysts of the invention have a platinum content of from 0.01 to 5% w/w, preferably from 0.01 to 2.5% w/w and more preferably from 0.1 to 1% w/w, based on the total weight of platinum and graphite support. The platinum is generally applied to the surface of the graphite support and is present substantially in the form of metallic platinum. Advantageously, platinum is applied to the surface of the graphite in fine distribution, for example by precipitating metallic platinum from a solution onto graphite supporting material suspended therein.

It is an essential feature of the invention that the graphite support has an apparent density of from 1.7 to 2.2 g/ml. Graphites having an apparent density of from 1.73 to 1.95 and in particular from 1.75 to 1.90 g/ml give particularly good results. By the apparent density we mean the quotient of mass and volume including all pores.

Preferably, the graphite support has a compressive strength of from 50 to 250 $N/mm^2$. Graphite supports having a compressive strength of from 50 to 150 $N/mm^2$ and especially from 60 to 120 $N/mm^2$ are particularly preferred.

We have also found that graphite supports having a porosity of less than 20%, in particular between 20% and 10%, as measured by, say, DIN 51,918, are particularly suitable.

The graphite support is generally present in suspendable form. Particularly good results are obtained when the particle size of the graphite support is from 1 to 600 $\mu$m. In general, use is made of a graphite support having a minimum ash content, e.g. 0.001 to 1% w/w, in particular 0.01 to 0.2% w/w. A suitable graphite is, for example, electrographite. The above parameters can be readily measured for the purpose of selecting appropriate material.

The catalysts of the invention are usually made by precipitating platinum from a platinum salt solution on to graphite particles suspended in the solution.

The catalysts of the invention may be used without further additions for hydrogenation reactions. Alternatively, they can be used in a partially poisoned state, for example as the result of the addition of poisoning agents such as compounds of sulfur, selenium, tellurium or arsenic, for specific hydrogenations such as the hydrogenation of nitrogen oxide. For this purpose, partially poisoned platinum-on-graphite catalysts having a sulfur and/or selenium content of from 3 to 15% atomic, based on platinum, are particularly useful. Examples of selective poisoning agents for use in the manufacture of the catalyst of the invention are sodium dithionite, alkali metal thiosulfates, alkali metal polythiosulfates, thiourea, hydrogen sulfide, alkali metal sulfides, alkali metal polysulfides or combinations thereof, telluric acid and arsenic acid.

The catalysts of the invention are obtained, for example, by precipitating metallic platinum from aqueous solution onto a graphite support suspended therein. To this end, it is usual to start from an aqueous solution of hexachloroplatinic acid or tetrachloroplatinic acid or a salt thereof. Compounds used to effect partial poisoning of the catalyst are advantageously added after the solution has been buffered with alkali metal acetate. Metallic platinum is then precipitated onto the graphite support by means of reducing agents capable of reducing the platinum compound to metallic platinum. Examples of suitable reducing agents are hydrazine, formaldehyde and formic acid. The use of formic acid gives particularly good results. For each gram atom of platinum it is advantageous to use from 100 to 1,000 moles of reducing agent. The temperature used during reduction to metallic platinum is advantageously from 60° to 90° C. Following the reduction stage, the suspended catalyst is isolated by filtration and washed, advantageously with water.

The catalysts of the invention are suitable for use in the hydrogenation of organic and inorganic compounds. They are used to advantage in the hydrogenation of olefinically or acetylenically unsaturated compounds and in the hydrogenation of carboxylic acids, aldehydes or ketones to the corresponding alcohols or of nitriles to the corresponding amines. The catalysts of the invention are also suitable for use in the hydrogenation of inorganic compounds, for example to remove oxygen, but especially to prepare hydroxylammonium salts by the hydrogenation of nitrogen oxide in the presence of mineral acids.

In the production of hydroxylammonium salts, the molar ratio of hydrogen to nitrogen oxide is usually kept between 1.5:1 and 6:1. Particularly good results are obtained when the molar ratio of hydrogen to nitrogen oxide in the reaction zone is carefully maintained between 3.5:1 and 5:1.

The acids used are advantageously strong mineral acids such as nitric acid, sulfuric acid and phosphoric acid. Also suitable are acid salts such as ammonium bisulfate. The reaction is usually started using 4N to 6N aqueous acids, and the acid concentration is not allowed to fall below 0.2N during the reaction.

The reaction is advantageously carried out at a temperature of from 30° to 80° C. and a particularly useful temperature range is 35°-60° C. The reaction is normally carried out at atmospheric pressure or an elevated pressure of up to, say, 30 bar. A particularly advantageous procedure when preparing the catalysts of the invention is to carry out the reaction under elevated pressure, e.g. a pressure of from 1.5 to 20 bar.

The platinum-on-graphite catalysts used advantageously have a content of platinum of from 0.1 to 5% w/w and in particular of from 0.2 to 1% w/w. For each liter of dilute mineral acid there will usually be used from 25 to 100 g, preferably 30 to 80 g, of platinum-on-graphite catalyst.

The invention is illustrated below with reference to the following Examples

EXAMPLE 1 a) Preparation of Catalyst

A graphite having the following data is used:

Ash content 0.12% w/w, particle size 50 to 71 μm, apparent density 1.87 g/cm$^3$, compressive strength of starting material 71 N/mm$^2$, porosity 11%.

50 g of this graphite and 0.6637 g of hexachloroplatinic(IV) acid.6H$_2$O are stirred overnight at 80° C. together with 68.4 ml of an aqueous solution containing 4.84 ml of concentrated hydrochloric acid and 1.02 ml of concentrated nitric acid. The resulting suspension is neutralized with sodium carbonate until the pH is 2.75. There are then added 2.5 g of sodium acetate followed by 26.72 mg of thiourea, after which 6.25 ml of concentrated formic acid are added to the suspension which is then stirred at 80° C. until the solution is free of platinum, this being precipitated as metallic platinum onto the graphite support material. The catalyst is then separated by filtration and washed with distilled water to neutrality. The catalyst contains 0.5% w/w of platinum as dry substance.

b) Hydroxylamine Synthesis 4.8 g of this catalyst are suspended in 120 ml of 4.3N sulfuric acid, and 7.75 l (STP) of a mixture of 35% v/v nitrogen oxide and 65% v/v hydrogen are fed to the suspension at 40° C. with vigorous stirring (3,500 rpm), per hour. The reaction is stopped after 4 hours, and the catalyst is separated by filtration. The liquid phase is analyzed. Following the addition of 120 ml of 4.3N H$_2$SO$_4$ the reaction is restarted with the same catalyst and kept going for another 4 hours, after which the liquid phase is again replaced by fresh sulfuric acid. This procedure (cycle) is repeated a number of times until the catalyst begins to show poor selectivity for hydroxylamine, as indicated by an increase in the N$_2$O content of the off-gas, at which point the test is stopped. The results are given in the Table below.

EXAMPLE 2

Example 1 is repeated except that the graphite used for making the catalyst is one having the following data: particle size 50–71 μm, apparent density 1.76 g/ml, compressive strength of the starting material 60N/mm$^2$, porosity 14%, ash content 0.03%.

The hydroxylamine synthesis is carried out as described in Example 1b). The results are given in the Table below.

EXAMPLE 3

Example 1 is repeated except that the graphite used for making the catalyst is one having the following data: particle size 50–71 μm, apparent density 1.87 g/ml, compressive strength of the starting material 100 N/mm$^2$, porosity 12.5%, ash content 0.05%. The hydroxylamine synthesis is carried out as described in Example 1b). The results are given in the Table below.

EXAMPLE 4

Example 1 is repeated except that the graphite used for making the catalyst is one having the following data: particle size 50–71 μm, apparent density 1.81 g/ml, compressive strength of the starting material 90N/mm$^2$, porosity 11%, ash content 0.03%. The hydroxylamine synthesis is carried out as described in Example 1b). The results are given in the Table below.

COMPARATIVE EXAMPLE

Example 1 is repeated except that the graphite used for making the catalyst is one having the following data: particle size 50–71 μm, apparent density 1.65 g/ml, compressive strength of the starting material 20N/mm$^2$, porosity 20%, ash content 0.12%. The hydroxylamine synthesis is carried out as described in Example 1b). The results are given in the Table below.

TABLE

| Example No. | 1 | 2 | 3 | 4 | Comp. |
|---|---|---|---|---|---|
| Number of cycles | 14 | 9 | 9 | 25 | 2 |
| Selectivity for NH$_2$OH [%][1] | 88.7 | 87.3 | 89.4 | 87.5 | 78.8 |
| Selectivity for NH$_3$ [%][1] | 8.8 | 9.0 | 7.1 | 8.3 | 14.0 |
| Selectivity for N$_2$O [%][1] | 2.5 | 3.8 | 3.5 | 4.2 | 7.2 |
| NO conversion [%][1] | 97.2 | 95.8 | 96.9 | 95.4 | 91.8 |
| Space-time yield* | 0.98 | 0.97 | 0.98 | 0.96 | 0.92 |
| Total yield of NH$_2$OH [g][2] | 193.7 | 120.2 | 124.4 | 333.3 | 23.1 |

*expressed as $\dfrac{\text{NO conversion [moles]}}{\text{l/h of 4.3N H}_2\text{SO}_4}$

[1] average values taken
[2] sum total of yields per cycle

We claim:

1. A platinum-on-graphite catalyst which comprises: a graphite support having an apparent density of from 1.70 to 2.2 g/ml, and having from 0.01 to 5% w/w/ of metallic platinum applied to the support.

2. A platinum-on-graphite catalyst as defined in claim 1, wherein the graphite support has a compressive strength of from 50 to 250N/mm$^2$.

3. A platinum-on-graphite catalyst as claimed in claim 1, wherein the graphite support has a porosity of less than 20%.

4. A platinum-on-graphite catalyst as claimed in claim 1, wherein the graphite support has a particle size of from 1 to 600 μm.

5. A platinum-on-graphite catalyst as claimed in claim 1, wherein the catalyst is partially poisoned with sulfur and/or selenium.

6. A platinum-on-graphite catalyst as defined in claim 1, wherein the apparent density of the graphite support is from 1.73 to 1.95 g/ml.

7. A platinum-on-graphite catalyst as defined in claim 1, wherein the graphite support has an apparent density of from 1.75 to 1.90 g/ml.

8. A platinum-on-graphite catalyst as defined in claim 1, wherein from 0.1 to 1% w/w of metallic platinum is applied to the support.

* * * * *

UNITED STATES PATENT AND TRADEMARK OFFICE
CERTIFICATE OF CORRECTION

PATENT NO. : 5,155,081

DATED : October 13, 1992

INVENTOR(S) : STEIGLEITER et al.

It is certified that error appears in the above-identified patent and that said Letters Patent is hereby corrected as shown below:

Claim 2, Col. 4, Line 65

"250N/mm$^2$" should read --250 N/mm$^2$--.

Claim 3, Col. 4, Line 66; Claim 4, Col. 5, Line 1; and Claim 5, Col. 5, Line 5

"claimed" should read --defined--.

Signed and Sealed this

Twenty-third Day of November, 1993

Attest:

BRUCE LEHMAN

Attesting Officer    Commissioner of Patents and Trademarks